FIG. 1

INVENTOR.
THOMAS W. MARTINEK
BY
ATTORNEY

Dec. 7, 1965 T. W. MARTINEK 3,222,137
APPARATUS FOR SURFACE REACTIONS
Filed Dec. 20, 1961 6 Sheets-Sheet 4

FIG. 4

INVENTOR.
THOMAS W. MARTINEK
BY
*Edward H. Lang*
ATTORNEY

Dec. 7, 1965 T. W. MARTINEK 3,222,137
APPARATUS FOR SURFACE REACTIONS
Filed Dec. 20, 1961 6 Sheets-Sheet 6

INVENTOR.
THOMAS W. MARTINEK
BY
Edward H. Lacy
ATTORNEY

United States Patent Office 3,222,137
Patented Dec. 7, 1965

3,222,137
APPARATUS FOR SURFACE REACTIONS
Thomas W. Martinek, Crystal Lake, Ill., assignor, by mesne assignments, to Union Oil Company of California, Los Angeles, Calif., a corporation of California
Filed Dec. 20, 1961, Ser. No. 160,882
2 Claims. (Cl. 23—285)

This invention relates to an apparatus and continuous process for carrying out organic reactions involving a dispersible solid phase and an organic phase. More particularly, this invention relates to an apparatus and continuous method for the conduction of reactions of an alkali metal with a reactable organic compound wherein a continuously replenished, fresh, active, extended surface of said alkali metal is presented in the reaction zone in intimate contact with the organic compound, whereby subsequent gas/liquid phase reactions of the adduct so formed are facilitated.

The problems associated with solid-liquid phase reactions in all fields of chemistry have been of long standing and relate all the way from physical changes such as adsorption (e..g. removal of dust or moisture from air, evaporation techniques, flaking of molten solids, production of granular solids, humidification, and the separation of metals from ores) to catalytic conversions of hydrocarbons adn the preparation of sodium peroxide. In all of these processes an attempt is made to either alter a physical form, change a physical composition, or initiate a chemical reaction through the intimate contact of a gas and solid, or a solid and liquid, or combination of these physical states. However, the results obtained are not always uniform, the processes are not truly continuous, reactant waste due to loss or side reactions is high, and the apparatus does not always function properly under optimum conditions for the reaction or physical change when conducted on a continuous basis.

This invention, directed to overcoming these and relate problems, is based on the discovery, made during a number of experiments with physical and chemical change, that the provision of a continuously replenished fresh surface of the solid phase contacting the liquid phase overcomes side reactions, speeds the main reaction, avoids mechanical loss of the solid phase, and allows the use of the proper phase in direct or indirect proportion to the reaction demands or kinetics.

The invention is illustrated by the drawings of apparatus designed for solid, liquid, and gaseous reactions of sodium and its compounds wherein.

A feature of this invention comprises the provision of one or more perforated-wall reaction zones in which a solid reactant or mixture of solid reactants is held in comminuted form, and through the perforations of which the liquid reactant is passed, in combination with one or more temperature-controlling zones and gas-diffusion zones which act upon the liquid reactant before and/or after contact with the solid reactant. In one embodiment of the invention, where the liquid reactant contains undesirable but reactive impurities which consume a portion of the solid reactant, the liquid reactant is previously mixed or reacted with a sufficient amount of the solid reactant to tie up the reactive impurities previous to the main reaction.

A feature of this invention is the provision of an apparatus particularly adapted to carry out the reaction of an alkali metal in solid form with a reactable aromatic hydrocarbon to form the colored, alkali-metal adduct thereof, and further reacting the adduct with carbon dioxide to form the corresponding alkali-metal salt of the carboxylic acid.

Another feature of this invention is the provision of an apparatus of the character just described which provides means for controlling the temperature, means for continuously introducing solid alkali-metal particles or segments into intimate contact with the aromatic reactant, means for isolating an agitation zone from the adduct-forming reaction zone, means for confining the solid alkali-metal particles or segments under intimate contact conditions with the aromatic material, means for observing the color changes taking place in the reaction zones, and means for carbonating the adduct and controlling the temperature simultaneously.

Another feature of my invention is the provision of means for continuously forming and introducing a fresh clean surface of alkali metal into contact with the aromatic material, means for passing the surface of alkali metal through the aromatic material in intimate and extended contact therewith, and means for continuously replenishing the fresh surface of alkali metal as the reaction proceeds.

The invention will be demonstrated by illustrating those forms of the apparatus and method found to apply to the reaction of an alkali metal with reactable aromatic hydrocarbons, such as those contained in solvent extract obtained from the solvent extraction of mineral lubricating oils, to form the alkali-metal adduct from which dibasic acids and other derivatives are formed. This reaction is disclosed in my copending application Serial No. 819,932, filed June 12, 1959 (now abandoned), same being incorporated by reference and in application Serial No. 220,344, filed on July 23, 1962, as a continuation-in-part thereof.

Figure 1:
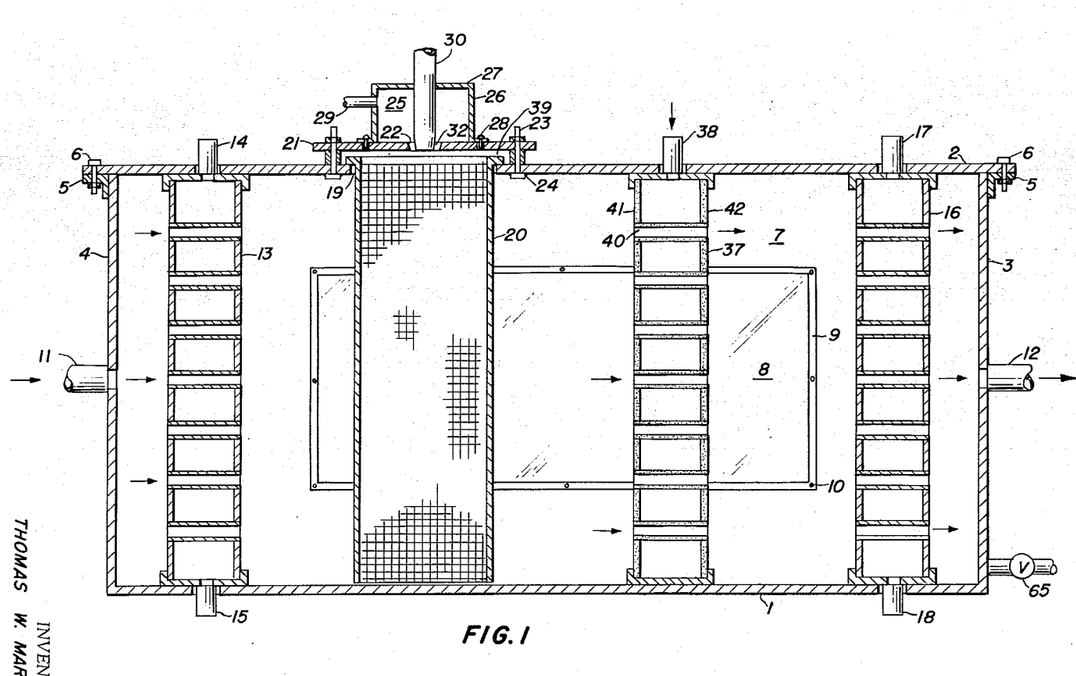
FIGURE 1 is a longitudinal, partial, cross-sectional view of a unit of the apparatus showing the heat exchanger zones, a solid-reactant retention zone, and carbonation means in one embodiment.

Referring to FIGURE 1 there is shown a cross-sectional view of one form of apparatus comprising a tank having bottom 1, top 2, sides 7 and end members 3 and 4. The top 2 is held to the ends and sides by means of flanges 5 and bolts 6. In the back wall 7 is window 8 held in liquid-tight relationship by means of frame 9, and a plurality of bolts 10 attaching through back wall 7. A rubber or Neoprene seal (not shown) can be used between the window and the the frame to effect a seal. A similar window is provided in the front wall opposite window 8 so that the course of the color reaction can be followed visually. A strong light can be provided on one side to aid in visual examination of the reaction where a color change takes place.

Feed-entry line 11 connects through wall 4 and product-exit line 12 connects through end wall 3. Heat exchanger 13 (shown in partial detail) is arranged with entry and exit conduits 14 and 15, respectively, connecting through bottom 1 and top 2 so that all of the flow of feed is through the horizontal orifices of the heat exchanger. A similar heat exchanger 16 (also shown in partial detail) is located at the opposite end of the apparatus and has entry line 17 and 18 for control of product temperature, as will be described. Any other known form of heat exchanger may be used, and the exchangers shown are merely illustrative.

Top member 2 has an aperture 19 into which is fitted basket 20, providing means for retention of the solid reactant, e.g., alkali-metal particles, within the path of the liquid reactant, hereinafter referred to as solvent extract, passing through the apparatus. Cover plate 21, having tapered aperture 22, is held over aperture 19 by means of bolts 23, which are tack welded, as at 24, to the under side of top 2 to facilitate removal of the plate 21. Chamber 25 formed by sides 26 and top 27 is fastened, by means of bolts 28 to cover plate 21.

Auxiliary solvent-entry conduit 29 connects from a cold-solvent supply source (not shown) through side 26 to chamber 25. Conduit 30, conveying alkali-metal droplets or "shot," extends in sealed relationship through cooling chamber 25 and terminates within aperture 22. A space 32 is provided between the edge of aperture 22 and the outer wall of conduit 30, the latter being slightly tapered at the end to allow passage of liquid solvent from chamber 25 to surround and encompass the solid alkali-metal particles descending in droplet, or "shot," form from conduit 30 into "basket" 20. Carbonator 37, having inlet conduit 38, fits across the cross-sectional area of the apparatus, as do the heat exchangers 13 and 16, and temperature during carbonation is controlled by the temperature of the gas entering 37. The top lip 39 of basket 20 engages the periphery of aperture 19 and is spaced from cover plate 21. Carbonator 37 has a plurality of horizontal tubes 40 connecting between plates 41 and 42. Carbon dioxide entering conduit 38 passes through plates 41 and 42 and tubes 40 into the alkali-metal adduct within the apparatus where heat exchange also occurs.

Figure 2:
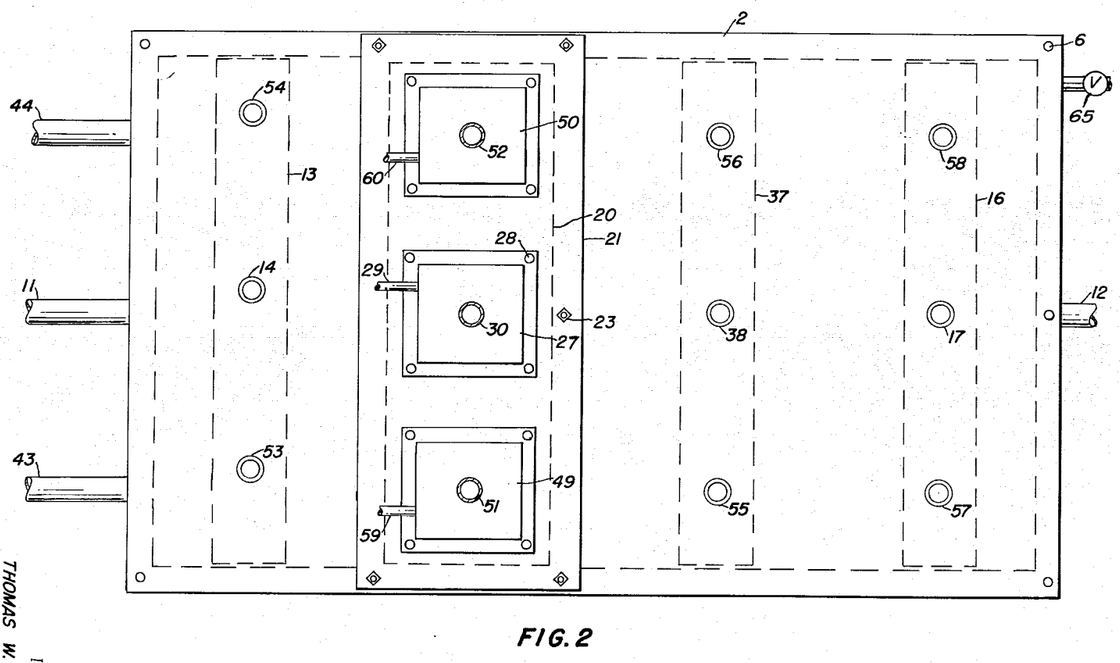
FIGURE 2 is a top view of the unit shown in FIGURE 1 with the cover 2 attached and portions of the apparatus shown in dotted lines.

FIGURE 2 is a top, plan view showing the placement of the parts just described with three inlet conduits 11, 43 and 44. Other multiple parts are correspondingly numbered to include additional conduits for heat exchanger 13, additional conduits 55 and 56 for carbonator 37, and additional conduits 57 and 58 for heat exchanger 16, if desired. Correspondingly, a plurality of conduits like 15 and 18 can be connected to the bottom of heat exchangers 13 and 16, if desired. Auxiliary solvent conduits 59 and 60 are connected to chambers 49 and 50, respectively, corresponding to the manner in which conduit 29 connects to chamber 25. The valved drain 65 is shown in wall 3. Basket 20 is shown in dotted lines.

The operation of the apparatus shown in FIGURES 1 and 2 is as follows:

Feed solvent extract is pre-treated by dispersing a minor portion of the sodium in the oil at 100° to 140° C., with temperatures of 125 to 135° C. preferred. A conventional sodium disperser may be used for this step and is not shown in FIGURES 1 and 2. This pre-treatment is incorporated to effect the reaction of impurities, such as water and other active hydrogen compounds, before the extract contacts the bed of sodium. Depending upon the amount and type of impurities present, this pretreatment step may or may not be necessary. Also, the minimum amount of sodium to be dispersed in this step will be dependent upon the amount and type of impurities present. Generally, the amount of sodium to be dispersed with the extract oil, or other reactable aromatic, is 1 to 2 parts of sodium per 30 parts of the total extract components.

The total extract in which a minor amount of sodium has been dispersed is then admixed with an "active-ether" or reaction solvent, such as methylal, tetrahydrofuran or dimethyl glycol ether, in ratios of solvent to hydrocarbon of from 2/1 to 8/1 as described in said copending applications. This is hereinafter called the feed mixture or dispersion. Mixing is accomplished in either conventional apparatus or apparatus similar to that described in U.S. 2,905,488 or 2,976,024.

This feed mixture is passed through inlet(s) 11, 43 and 44, and subsequently heat exchanger 13, wherein the temperature is reduced to $-60°$ to $+80°$ C. in accordance with said copending application. From the heat-exchanger zone, the cooled feed dispersion passes through the basket or screen 20 filled with the bed of alkali metal which is introduced as "shot" or droplets from inlet 30. The mesh of basket 20 is fine enough to retain the alkali metal particles therein until those that pass through the screen are consumed in the balance of residence time of the unreacted solvent extract in the apparatus. The size of the particles of alkali metal introduced may vary from as small as about 0.05 mm. to about 1 inch in diameter, and the openings in the basket may vary from about 0.04 to 0.10 mm. The shot or droplets may be formed by any of several methods known to this art, provided means are taken to prevent contamination and subsequent reaction with air or moisture. Alkali metal is added to basket 20 at a rate sufficient to maintain same substantially completely filled. Preferably, the basket is constructed of 325 mesh screening. If desired, the temperature of the alkali metal is reduced before entry into the "basket" by injecting a minor amount of "active-ether" solvent into cooling zone 25 through inlet 29. The cold solvent exchanges heat with the alkali-metal particles as it is sprayed into the basket area through orifice 22 between tapered nozzle 32 of inlet 30 and base plate 21. As the particles of alkali metal drop into the feed mixture, they begin to react and diminish in size. The particles are heavier than the solvent extract and gradually sink into the basket. Adjacent reacting particles of alkali metal frequently coalesce into a matrix within basket 20, particularly at the bottom thereof. As solvent extract passes through the interstices of the matrix, it reacts with and dissolves the metal of the matrix forming a new layer of matrix from above.

The reaction between the alkali metal and the solvent extract forms an intensely colored adduct which is clearly evident. The course of this phase of the reaction is observed through window 8 and an opposite window (not shown) in the sides of the apparatus. By directing strong light through one window on one side of the apparatus, no trouble is experienced in seeing, sensing, and/or recording the rate or intensity of color formation.

The colored adduct flows from the environs of basket 20 through the tubes 40 of carbonator 37, which introduces or disperses carbon dioxide into the adduct to form the alkali-metal salt of the corresponding carboxylic acid. At this point, the reaction mixture is controlled by the temperature of the gas, a temperature of about $-60°$ to $80°$ C., and the addition of and reaction with carbon dioxide causes a dissipation of the color which is observed or detected through the windowed sides. The final stage of the reaction is further adjustment of the temperature to about 20° to 40° C. by means of heat exchanger 16, and recovery of the products through conduit 12.

If it is desired to run the overall reaction in stages, a series of heat exchangers, baskets, and carbonators can be employed. In this case, heat exchanger 16 would be followed by equivalent reaction-area 20 and carbonation area 37, and so forth. Alternatively, end-wall 3 may be mounted between carbonation zone 37 and heat-exchange zone 16, and outlet 12 may feed into inlet 11 of another apparatus similar to FIGURE 1. In this case, reaction products could be withdrawn at any one or more of successive stages of reaction continuously.

In the reactions of sodium with certain portions of extract oils, as disclosed in copending applications, one of the main problems associated with the reactions is recovery of excess sodium used. It has been found that more complete reaction of the reactable portion is effected when a large excess of sodium is employed. The reaction is not only more complete, but the products obtained are also more desirable when a large excess of sodium is employed. However, when such excess is used, it has been found difficult to recover the excess from the reaction mixture. Filtration is impractical because the filtering medium becomes readily clogged or retains contaminants other than the sodium particles, and in some cases retains insoluble but desirable sodium salts. The apparatus of this invention overcomes the difficulties associated with removal of the excess sodium and yet permits a large excess of sodium surface.

Figure 3:
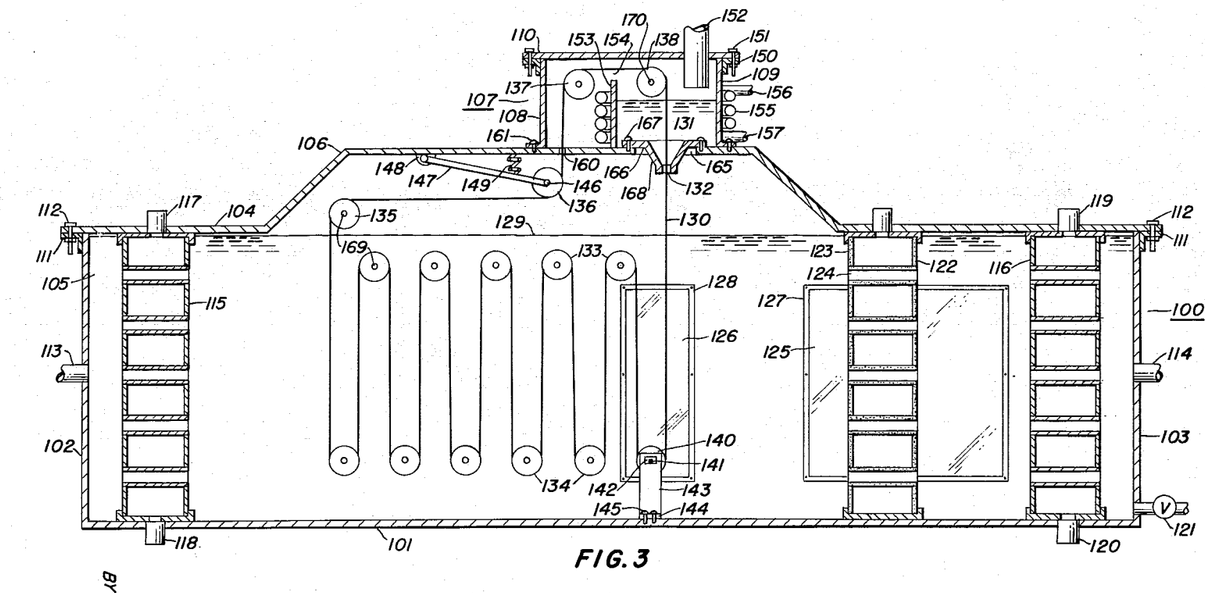
FIGURE 3 is a longitudinal, partial, cross-sectional view of another form of apparatus showing a different form of solid-reactant control means
Figure 4:
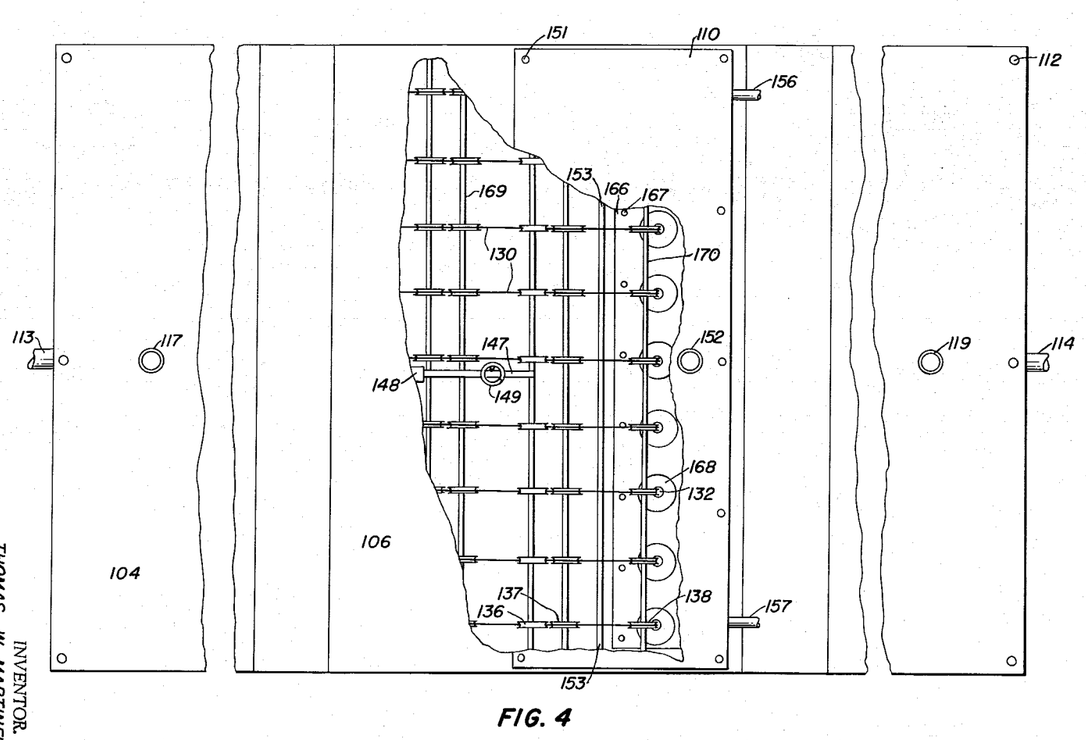
FIGURE 4 is a top view of FIGURE 3 with the top members 110 and 106 partially cut away.

This invention also encompasses another means and method for accomplishing these objectives, as shown in FIGURES 3 and 4. This embodiment consists in an elongated reactor 100, having bottom 101, ends 102 and 103, top 104, and sides 105. Top 104 has a dome portion 106, and an upper housing 107 formed by wall members 108 and 109 and top 110.

Top member 104 is held to sides 102, 103, and 105 by means of flanges 111 and bolts 112. The apparatus has an inlet conduit 113 in wall 102, and an outlet conduit 114 in wall 103. Heat exchangers 115 and 116 are the same as shown in FIGURES 1 and 2, and have the same function with appropriate inlet and outlet conduits 117, 118, 119, and 120 connected thereto. A valve drain is provided at 121. Other portions of the apparatus that are similar to the apparatus of FIGURE 1 are carbonator 122, having walls 123, and tubes 124 and windows 125 and 126 held by frames 127 and 128, respectively. The liquid level in the apparatus is shown at 129.

The embodiment shown in FIGURES 3 and 4 has as means for providing a continuously replenished, extended surface of alkali metal in contact with the feed mixture an endless wire or cable 130 or a series of parallel wires or cables 130 which pass as an endless belt through a zone of molten alkali metal 131, through an orifice 132, into a bath of solvent extract, the top level of which is shown at 129 by extended passage over and under a plurality of parallel banks of pulleys 133 and 134 immersed in said solvent extract, maintained at the desired reaction temperature, over a return pulley 135 and idler pulley 136, a driven pulley 137, a second return pulley 138, and back to said molten alkali metal zone 131.

To accomplish these functions, the apparatus is provided with a top bank of immersed, horizontal, spaced pulleys 133 which are supported between the wall 105 and the adjacent wall by means of suitable bearings and support means, not shown, and a bottom bank of immersed, horizontal, spaced pulleys 134, similarly supported. One means for holding and supporting the pulleys in rotatable relationship with the sides is shown with pulley 140 having shaft 141 carried in bearing 142 of support 143 which has base 144 fastened to bottom 101 by means of stud bolts 145. Numerous other means for mounting pulley shafts, such as hinged bearing blocks welded to the sides or to a movable mounted plate, may be employed.

Idler pulley 136 has shaft 146 connected rotatably to trunnion 147 which is supported at its other end by means of bearing 148, attached to top 106. Spring 149 mounted between top 106 and trunnion 148 gives idler 136 a downward bias to take up slack in the wires 130. Other arrangements can be used to move pulley 136 downward against the wires 130, e.g., the weight of the pulley itself or a torsion bar can be provided instead of spring 149.

Top 110 fastens to sides 108 and 109 by means of angles 150 and bolts 151, and has conduit 152 therethrough to convey alkali metal to zone 131. Baffle 153 provides one wall of zone 131 and is spaced from top 110, as at 154, to provide a passageway for wires 130. Coil 155 having inlet 156 and outlet 157 surrounds zone 131 for the purpose of supplying heat thereto and maintaining said alkali metal in the liquid state. An elongated slot 160 is provided in top 106 for the free passage of wire 130 therethrough. The entire assembly is attached to top 106 by means of studs 161. The zone between liquid level 129 and top 106, and the zone surrounding pulleys 137 and 138 over the molten alkali metal 131, is filled with an inert gas, such as nitrogen, maintained at a controlled temperature.

Top 106 has opening 165 with orifice plate 166 fastened thereacross by means of bolts 167. Orifice plate 166 has a conical depression 168 with an orifice 132 at the bottom.

The shafts on which pulleys 133, 134, 135, etc., are mounted are indicated at 169.

As seen from FIGURE 3, the wire 130 passes downwardly through molten alkali metal 131, and thence through conical depression 168 and orifice 132 into the feed mixture within reactor 100. Plate 166 with conical depression 168 and orifice 132 causes the formation of a uniform coating of alkali metal on the wire which solidifies on passage through the inert atmosphere maintained at a temperature sufficiently low to hasten solidification. As the coated wire 130 passes through the feed mixture, adduct formation takes place. There is a gradual loss of this coating of alkali metal and the coating is very thin or dissolved completely when the wire reaches the pulley 135. The carbonation taking place in dispersion unit 122 is under the conditions previously described.

Numerous arrangements of banks of wires and pulleys with metal coating baths or sections are possible. One such arrangement is shown in FIGURE 4 where the numerals used correspond to parts having the same numerals in FIGURE 3.

Figures 5, 6, 7:
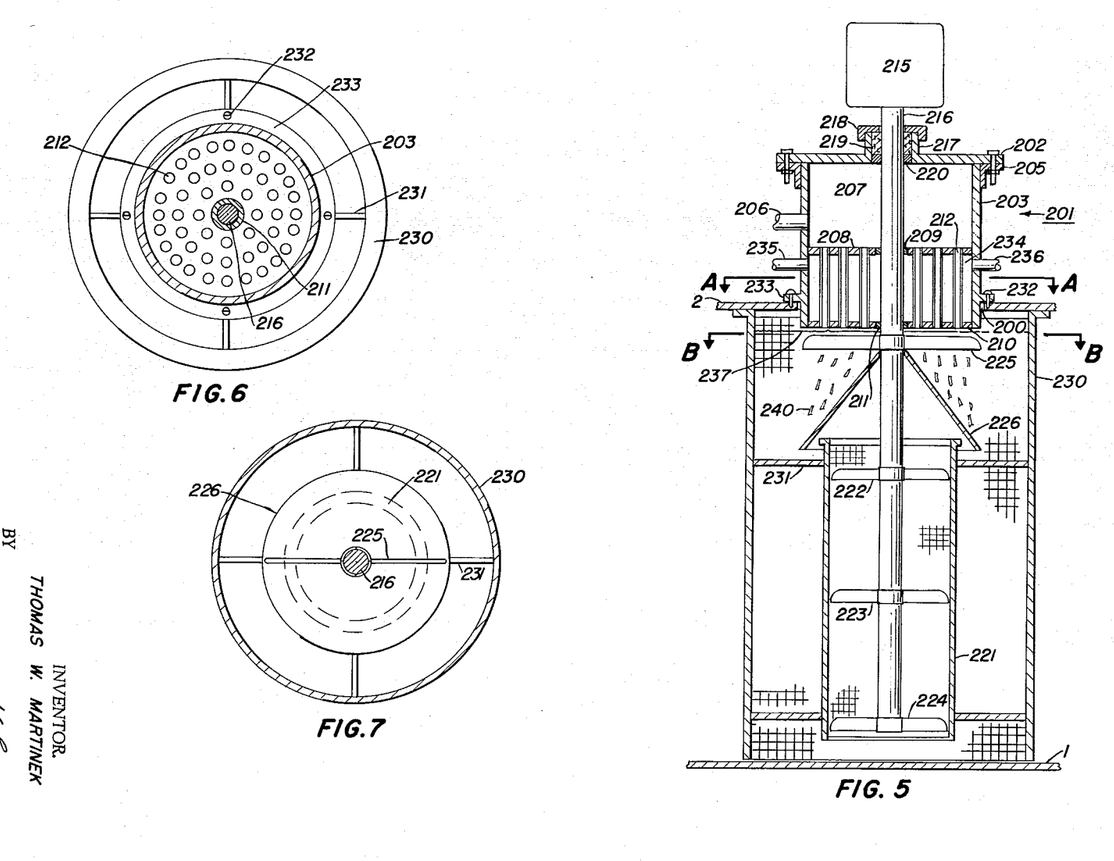
FIGURE 5 is a partial, cross-sectional view of another embodiment of the solid-reactant-dispersion-retention and -control means which can be used within the embodiment shown in FIGURE 1.
FIGURE 6 is a cross-sectional view taken along lines A—A of FIGURE 5.
FIGURE 7 is a cross-sectional view taken along lines B—B of FIGURE 5.

FIGURE 5 is a partial view in cross-section showing a modified form of the apparatus with different means for the preparing ribbon-, plug-, or rod-shaped pieces of alkali metal for addition to and reaction with the solvent extract. In this embodiment, the top 2 has opening 200 in which is fitted cylindrical housing 201 having top 202, held to side 203 by means of bolts engaging flanges 205 in a manner previously described. Inlet 206 connects through side 203 to enclosure 207. Transverse wall 208 carries thrust bearing 209, and spaced therefrom is transverse bottom 210 with a second thrust bearing 211. Connected between wall 208 and bottom 210 are a plurality of conduits 212 communicating at the top with enclosure 207 and opening through wall 210. Motor 215 is connected to shaft 216 which passes through stuffing box 217, having cover 218 and seal member 219. Bearing 220 forms the bottom of stuffing box 217.

Shaft 216 is carried in rotatable relationship by bearings 209, 211, and 220 and extends into inner basket 221 which forms an enclosure for impellers 222, 223, and 224. Shaft 216 also carries cutter blade 225 which is closely and evenly spaced in cutting relationship to the bottom surface of wall 210. Conical baffle 226 also attaches to and turns with shaft 216. Basket 221 is constructed of a network of wires, is open at the top and closed at the bottom, and is supported within outer basket 230 of similar wire network construction by means of brackets 231. Outer basket 230 fits between top 2 and bottom 1 of the apparatus. These component parts may be tack-welded together for ease of construction.

Attachment of housing 201 to top 2 is through studs 232 through flange 233. The zone 234, surrounding the outside of conduits 212, is supplied with heating medium by means of inlet conduit 235 and outlet 236. The liquid level 237 of the solvent extract is maintained in the proximity of the lower surface of wall 210 and cutter blade 225 remains immersed in extract. Particles of alkali metal are shown at 240. Further details of construction are shown in FIGURE 6, a cross-section taken along lines A—A of FIGURE 5 with top 2 removed, and in FIGURE 6, a cross-section taken along lines B—B of FIGURE 5. The assembly of FIGURES 5, 6 and 7 can replace basket 20; conduit 30, and associated parts shown in FIGURE 1.

The operation of the device shown in FIGURES 5, 6, and 7, when so arranged within the reactor tank of FIGURE 1, is as follows. The feed mixture is passed through line 11 and through baskets 230 and 221, and maintained at level 237 with an atmosphere of nitrogen thereover. Molten alkali metal is introduced into zone 207 by means of conduit 206. Heating or cooling fluid is introduced, by means of conduit 235, into zone 234 and removed by conduit 236. Motor 215 revolves shaft 216, cutter blade 225, and impellers 222, 223, and 224. Liquid alkali metal proceeds from zone 207 into conduits 212, adjusted to a temperature of approximately the melting point and forced out the lower ends thereof in a plurality of spagetti-like, or ribbon-like, forms or strips depending on the cross-sectional shape of conduits 212, which strips are then cut off into segments by cutter blade 225. These segments drop through the extract, are prevented from entering basket 221 by baffle 226, and fall into basket 230, forming a matrix therein. This matrix is continuously dissipated as the reaction proceeds and basket 221 provides a zone free of matrix in which impellers 222, 223, and 224 can rotate and cause the circulation of solvent extract therethrough.

Figure 8:
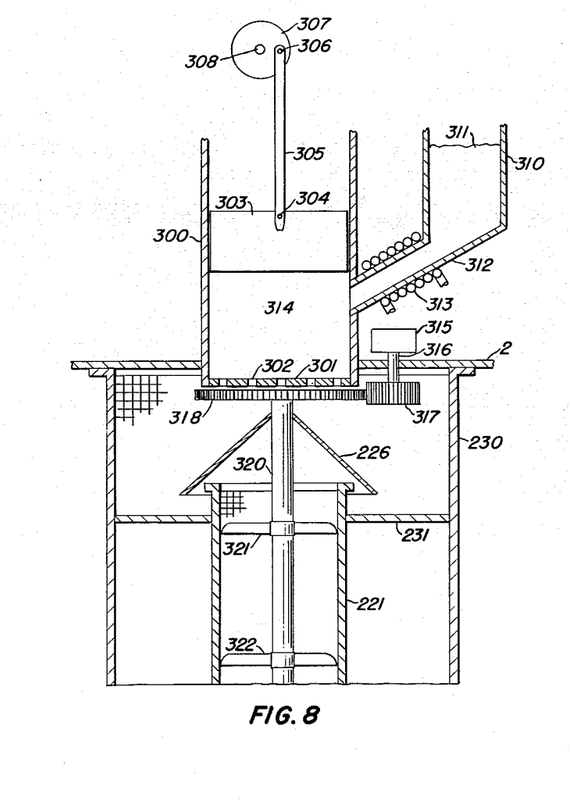
FIGURE 8 is a cross sectional and partially diagrammatic view of another form of solid-reactant control means.
Figure 9:
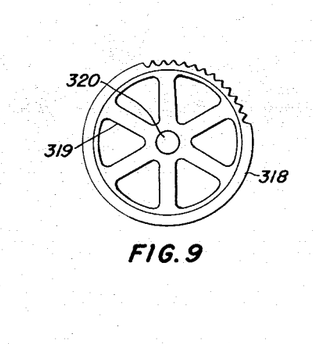
FIGURE 9 is a plane view of the ring gear 318 having cutting spokes 319.

FIGURES 8 and 9 show still another combination of means for introducing segmented particles of alkali metal into the solvent extract. In this embodiment, the parts are shown in simplified form for illustrative purposes and only the essential parts of the apparatus appear, some of which are only partially illustrated since they have been more fully described in connection with the other figures. Thus, top 2 supports basket 230, and internal basket 221 is held in position therein by brackets 231, as previously described.

A vertical cylinder 300, having perforated bottom 301 with openings 302 therein, houses piston 303, having wrist pin 304, connected to connecting rod 305 and the arrangement is provided with a power source, not shown, for reciprocating same. Rod 305 connects through pin 306 to crank 307 rotating on shaft 308. A reservoir 310 contains a supply of alkali metal 311 in liquid, semi-solid, or soft-soap consistency form. Reservoir 310 has bottom conduit 312, surrounded by coil 313 communicating with zone 314 ahead of piston 303.

Motor 315 is connected to shaft 316 and pinion gear 317 which in turn engages ring gear 318 having cutting spokes 319 mounted on shaft 320 and carrying impellers 321 and 322 within basket 221. Baffle 226 is mounted on shaft 320 and rotates therewith. A bearing, not shown, is provided at the bottom of shaft 320. Cutter spokes 319 are in close proximity to the under surface of perforated bottom 301 so that a cutting action therewith is obtained as motor 315 drives ring gear 318.

In operation, alkali metal from reservoir 310 passes through conduit 312 by gravity or pressure flow into zone 314 as piston 303 is in the upward position. On the down stroke of rod 305 piston 303 advances past the opening of conduit 312 and presses the alkali metal in zone 314 through the orifices 203 into the path of rotating cutter blades 319.

Although the invention has been illustrated by reference to the drawings, it is understood that several variations are apparent therefrom. I contemplate that a plurality of elongated reactors as described herein can be connected in series so that the reaction products from one pass directly into one or more succeeding reactors. Basket 20 can be a single basket extending across the cross-section of the apparatus or a series of closely-spaced or contiguous baskets so arranged, as long as the means for introducing comminuted, solid alkali metal communicates within the basket or baskets. An arrangement as shown in FIGURE 1, or as shown in FIGURES 4, 5, and 6, or as shown in FIGURES 7 and 8, when used with a reactor body like that shown in FIGURE 1, may be connected to one or more reactors such as shown in FIGURE 3. Also, the baffle means 226 shown in FIGURE 5 and FIGURE 8 can be attached to the top of basket 221 instead of rotating with shaft 216. The direction of flow of liquid reactant through the apparatus can be reversed, as well as the direction of travel of the endless belts in relation to the flow of liquid reactant so that the reaction with the gaseous reactant precedes the reaction with the solid-phase reactant.

The baskets 20, 230, and 221 can be formed of wire mesh, perforated steel sheet, or screen, or formed by means of welded steel strapping. The openings therein may be of any desired shape and should be small enough to retain the solid comminuted reactant until each particle is about 0.04 to 1.0 mm. in diameter, viz., the perforations may be 0.04 to 1.0 mm. in their largest dimension. In some applications the performations may be an inch square or larger. Also, a plurality of baskets may be used in series within the enclosure defining the reactor.

All of the parts of the apparatus are constructed of materials which are inert to the reactants and reaction products, e.g., any structural metal or alloy, steel, iron, brass, aluminum, and the like except gas-diffusion means 37. The walls 41 and 42 and the tubes 40 of diffusion means 37 are constructed of any material which provides for the passage of gases therethrough, can be cleaned, easily fabricated and is inert to the reactants and reaction products. The walls only or tubes only or both, or combinations thereof can be of porous material. Such materials include porous ceramics, sintered glass, porous plastics, and the like.

The particular placement of conduits and cooling or heating zones is subject to variation depending on the design of the equipment desired. Various valves, auxiliary pumps, supply tanks, and associated equipment normally used with an apparatus of this nature are not shown for simplicity.

In the arrangement shown in FIGURES 3 and 4, the various pulleys 133, 134, etc., can be closer together than is shown. The pulley arrangement can be replaced by a multi-grooved cylinder over which the wire 130 passes. The wire 130 may be in the form of a belt used singly or in substantially parallel arrangement. The direction of travel of the wire 130 may be reversed from that shown, although a feature of this invention is the provision of a pulley or grooved-cylinder arrangement which conveys the solid reactant in a direction countercurrent to the direction of flow of liquid reactant. The driven pulley can be any one or more than one of the pulleys shown. Baffle 226 may be attached to the top of basket 221, to brackets 231, or to the inner walls of basket 230. Other arrangements for making the baskets removable can be used. One, two, or more cutting spokes 319 may be used in the embodiment shown in FIGURES 8 and 9.

The process of this invention incorporates the reaction conditions and reactants, etc., of copending application Serial No. 819,932 and is directed to the following steps. Continuously conveying liquid reactant, which is any material which is capable of forming a reaction product with a solid reactant, illustrated by the reaction of solvent extracts obtained in the solvent refining of mineral lubricating oils, under reaction conditions into contact with a continuous supply of comminuted solid reactant, illustrated by an alkali metal, in a reaction zone, thoroughly mixing the reactants in the reaction zone, and continuously conveying the reaction product to a second reaction zone wherein it is caused to react with a gaseous reactant in diffused form, as illustrated by carbon dioxide, and continuously withdrawing the reaction products. As part of the process, the comminuted solid is confined in a perforated zone which prevents the occlusion thereof of any remaining unreacted solid particles with the first reaction product. Also, the mass of first reaction product is continuously treated with the gaseous reactant by passage of the reaction product through a substantially continuously replenished wall of bubbles of the gas by means of the diffusion means shown. Thus, the carbonation reaction is completed in a relatively short time on a continuous basis. Another feature of the process is the provision of temperature control before the first phase of the reaction begins, during the last phase, and after the last phase of the reaction. The process of this invention comprises continuously passing a liquid reactant through an elongated reactor into contact with a confined body of continuously replenished solid reactant, passing the reaction product into contact with a continuously replenished and dispersed volume of a gaseous reactant wherein the flow of reactants and products are in a single liquid phase through the elongated reactor. These and other features of this invention are expressed in the appended claims which constitute the only limitations on this invention.

The apparatus and process disclosed herein can be applied to a wide variety of reactions wherein it is desired to react a dispersible solid phase with an organic phase. Illustrative reactions are the reaction of sodium with naphthalene to form the sodium naphthalene adduct, the reaction of sodium with tetraphenylethylene to form disodium tetraphenylethylene, the reaction of sodium with triphenylboron to form triphenylboronsodium, the reaction of the foregoing hydrocarbons with sodium alloys, such as alloys of sodium with potassium, mercury, lead, tin, arsenic, gold, nickel, cadmium, thallium, bismuth, or antimony, the conversion of aliphatic esters to alcohols by reaction with an alkali metal, the use of alkali metals or other solid reactants to refine hydrocarbons, the reduction of aromatic hydrocarbons, the Claisen reaction, and reactions involving sodium hydride.

The starting material for the reaction may be any organic reactant and the process is particularly applicable to complex, polynuclear, and/or heterocyclic aromatic hydrocarbons from synthetic or natural sources which require close temperature control and which react with difficulty. A preferred and unique reactant comprises high-molecular-weight complex hydrocarbons from petroleum sources, such as reformate bottoms, reformate polymers, FCC recycle stock and solvent extracts obtained as a waste product in the solvent refining of mineral lubricating oils. Solvent extracts represent a rich source of complex polycyclic alkyl aromatic and/or heterocyclic molecules which, when converted to alkali-metal adducts, or mixed mono-, di- and polycarboxylic acids or salts thereof, provide by products having utility in resin preparation, corrosion inhibition, and other uses wherein the polyfunctionality of the products is employed. However, solvent extracts are difficult to use because of their complex structures and because of the presence therein of contaminants of unknown structure which cause side reactions and the formation of products that are difficult if not impossible to separate and identify. The instant apparatus and process is adapted to handle such complex feed materials with efficiency.

Solvent extracts from lubricating oil manufacture, reformate by-products, and FCC recycle stock are described in detail in said copending applications and since the physical and chemical characteristics of these materials are well known it is not necessary to describe them in detail. Solvent extracts, for example, are characterized by having API gravities of about 8.0 to 15.0, viscosities at 210° F. of 200 to 1500 SUS, low VI, average molecular weights of from about 300 to 750; they contain from about 1.9 to 4.5 wt. percent of sulfur, 0.1 to 1.0 wt. percent of nitrogen and oxygen, and have about 1.7 to 3.5 average number of rings per mean aromatic molecule. They are further characterized by their content of alkyl-substituted mononuclear, dinuclear, trinuclear, tetranuclear and pentanuclear compounds, with one or more heterocyclic rings attached thereto, and alkyl groups having a total of 15 to 22 carbon atoms in each molecule. These and other characteristics are set forth in detail in said copending applications.

In the process of this invention, the adduct, the salt or acid salt, or the mixed acids, may be separated as the final product depending on the established objective. The process contemplates dispersion of the solid reactant with the complex organic feed material at a given temperature, dispersion of the mixture in a diluent or reaction solvent where deemed necessary, cooling or heating the dispersion to a specified temperature, contacting the dispersion with the solid reactant in the form of finely divided particles, or a previously formed matrix in a solid-confining zone, to form an addition product or the like, reacting the addition product with a gas or vapor at controlled temperatures to form a salt or other derivative thereof, cooling the product and recovering the final product for purification, fractionation, hydrolysis, or any other finishing steps. As applied to the preparation of mixed mono-, di- and polycarboxylic acids from solvent extracts, the process represents a feature of the invention.

It is to be understood that the apparatus and method of this invention constitute an improvement over copending application Ser. No. 819,932. The preliminary steps including pre-dispersion of part of the alkali metal in all of the solvent extract, filtering, stripping, washing and hydrolysis or acidification as disclosed in said copending application are considered to be part of the over-all process of this invention. Likewise, in regard to the apparatus, the instant apparatus is intended to replace the reactors 10 and 12 referred to in said copending application and the alkali metal dispersator 4, the various filters, strippers, wash kettles and the like disclosed therein are to be used in conjunction with the instant apparatus.

The embodiments of the invention in which an exclusive property or privilege is claimed are defined as follows.

1. An apparatus comprising, in combination, an enclosure having top, bottom, side and end walls defining an elongated reaction chamber, means in one end wall for introducing liquid reactant into said chamber, means in the opposite end wall for removing liquid product from said chamber, a first heat-exchange means extending transverse said chamber adjacent said first end wall, a second heat-exchange means extending transverse said chamber adjacent said opposite end wall, means for dispersing a comminuted solid reactant comprising a conduit for conveying same into said chamber through said top wall between said first and second heat-exchange means, cooling means associated with said conduit at the discharge end thereof, a perforated basket transverse said chamber to receive said solid reactant, and means for dispersing a gaseous reactant transverse said chamber between said means for dispersing said comminuted solid reactant and said second heat-exchange means.

2. An apparatus in accordance with claim 1 in which said perforated basket extends through an aperture in the top wall of said reaction chamber, said perforated basket having an open top adjacent the discharge end of said conduit and a circumferential lip around said open top registering with the edge of said aperture, a cover plate in sealed relationship with said top wall and extending over the open top of said perforated basket, an aperture in said cover plate, a cooling chamber in sealed relationship with said plate and encompassing the discharge end of said conduit, the discharge end of said conduit terminating at and being spaced from the aperture in said cover plate and means for introducing a cooling medium into said cooling chamber.

References Cited by the Examiner

UNITED STATES PATENTS

| Re. 24.123 | 2/1956 | Cohen et al. | 260—514 |
| 2,590,436 | 3/1952 | Luten | 23—1 |
| 2,850,360 | 9/1958 | Bottenberg | 23—252 |
| 2,927,006 | 3/1960 | Brooks | 23—252 |

OTHER REFERENCES

Germany, Auslegeschrift 1,091,568, Oct. 27, 1960 (printed application) (5 pp. spec.; 1 sht. dwg.).

MORRIS O. WOLK, *Primary Examiner.*

MAURICE A. BRINDISI, *Examiner.*